July 8, 1941.　　　　G. LEE　　　2,248,633
PEANUT HEATER
Filed April 22, 1939
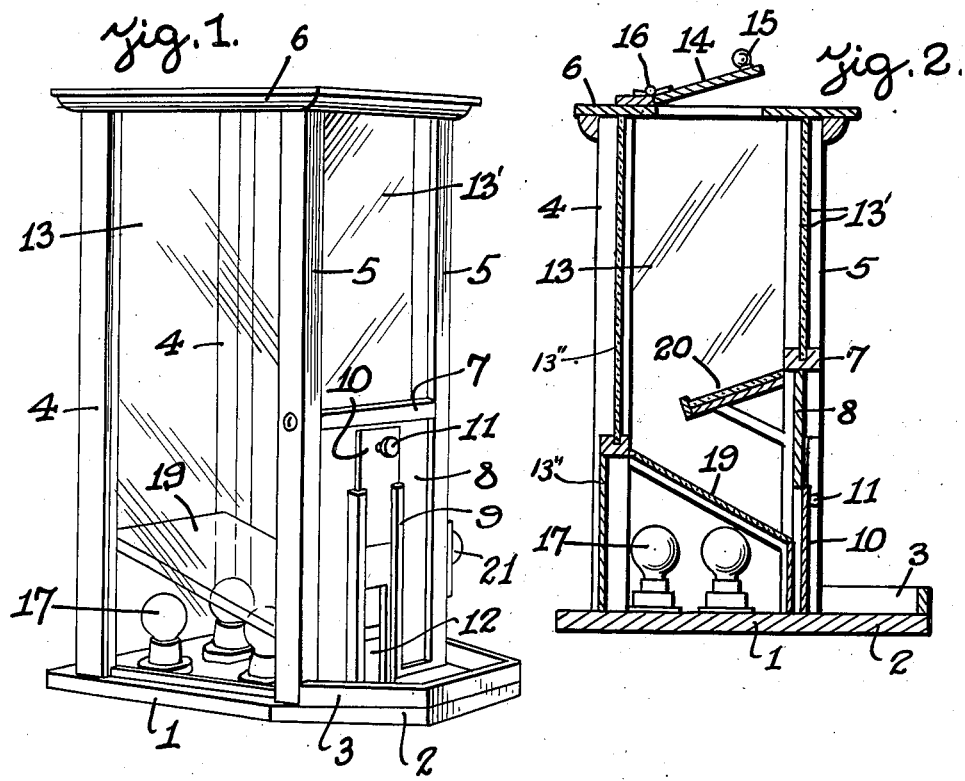
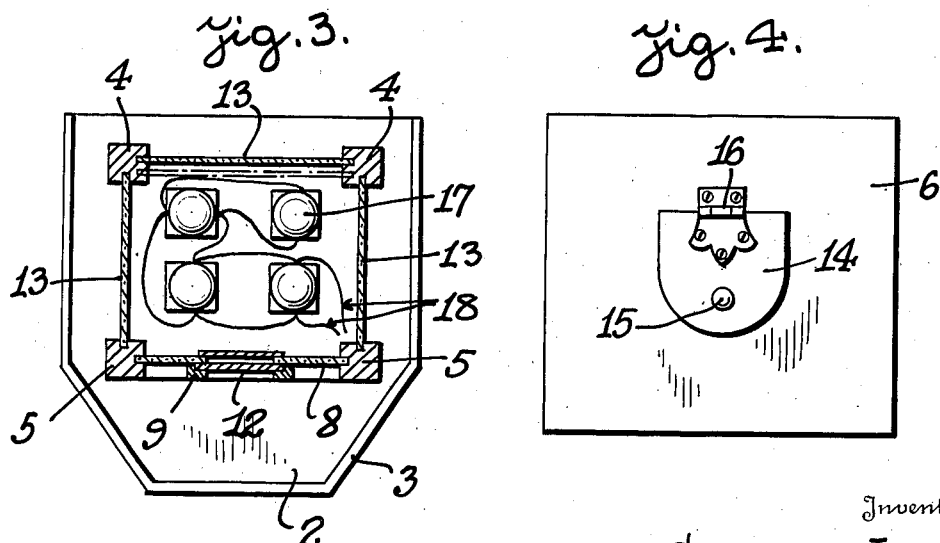
Inventor
George Lee
By Lester L. Sargent
Attorney Patented July 8, 1941

2,248,633

UNITED STATES PATENT OFFICE 2,248,633

PEANUT HEATER

George Lee, Elk Grove, Wis.

Application April 22, 1939, Serial No. 269,529

2 Claims. (Cl. 34—88)

The object of my invention is to provide a novel peanut heater for the purpose of keeping heated roasted peanuts in stores, restaurants etc., and requiring only four ten watt electric bulbs to maintain the desired temperature.

I attain these and other objects of my invention by the device illustrated in the accompanying drawing in which:

Figure 1 is a perspective view of the invention;

Fig. 2 is a vertical section through a modification of the invention having the added shelf 20;

Fig. 3 is a transverse section on a plane just above the bulbs and looking down and is a view common to both forms of the invention, and, Fig. 4 is a top plan view of the invention.

Referring to the accompanying drawing, I provide a preferably wooden cabinet comprising a base 1, as shown in Figs. 1 and 3, having a front extension tray 2 and tray rim 3. On base 1 are mounted rear posts 4 and front posts 5 on which is mounted the top 6. Mounted in the posts 4 is a rear glass panel 13 and in posts 4 and 5 are mounted similar side glass panels 13, extending from the top 6 to the base 1, and in the post 5 an upper front glass panel 13' which extends to the cross bar 7. A lower front panel 8 is mounted below cross bar 7 and has spaced guide strips 9 in which a vertically slidable door 10 is mounted. Door 10 has a suitable knob 11 for operating it so that it may be moved to open or close the doorway or slot 12, which opens on to the tray 2. Top 6 has a door 14 which in turn has a knob 15 and is hingedly mounted on top 6 by hinge 16, as shown in Fig. 4.

Mounted on the base 1 are several electric bulbs 17 supplied with electric current through the wire 18. Above the bulbs 17 is mounted slanting heating shelf 19, preferably of glass to retain the heat, the lower edge of which is raised above the level of the tray 2, as shown in Figs. 1 and 2.

Referring to Fig. 2, there is illustrated a modification of the invention having a rear panel in two sections 13' and having a peanut supporting shelf 20 mounted on the front of the frame and positioned to slant in an opposite direction from shelf 19, and extending approximately two thirds of the distance across the cabinet as shown in Fig. 2, to somewhat restrict the flow of peanuts to the doorway 12.

Peanuts are supplied to the heater through the opening covered by the door 14 in the top 6 and rest on the slanting heating shelf 19 and are heated by the vertically positioned bulbs 17, the shelf 19 being of glass tends to hold the heat as well as functions to discharge the peanuts. The door 10 is raised to allow as many peanuts as are desired to flow into tray 2.

In the form of the invention shown in Fig. 2, the added shelf 20 somewhat restricts the flow of peanuts to the doorway 12, and also permits the peanuts from above to drop on the lower glass shelf as rapidly as peanuts are wanted and sold. Thus, there is a smaller amount of peanuts to heat at one time.

As the apparatus has a flat bottom it may be conveniently placed on any flat surface such as counter or table.

What I claim is:

1. In a peanut heater, the combination of a cabinet, a hinged door in the top thereof, a base extending beyond the front of the cabinet to form a tray, a vertically slidable door for discharge of peanuts onto the aforesaid tray, a plurality of rows of electrical bulbs in the base of the cabinet for heating the peanuts, a slanting heating shelf extending over both rows of bulbs and having its lowermost edge adjacent the bottom of the aforesaid vertically slidable door for discharge of the peanuts, and a reversely disposed peanut supporting shelf spaced above the heating shelf to limit the number of peanuts reaching the heating shelf.

2. In combination with the apparatus defined in claim 1, the aforesaid shelf having its lowermost end spaced in proximity to the upper end of the heating shelf and relatively near the rear wall of the cabinet for limiting the flow of peanuts to the heating shelf.

GEORGE LEE.